United States Patent
Sawyer et al.

(10) Patent No.: US 6,487,592 B1
(45) Date of Patent: Nov. 26, 2002

(54) METHOD AND APPARATUS PROVIDING A CABLE MODEM MANAGEMENT AND PROVISIONING SYSTEM

(75) Inventors: Wilson Sawyer, East Hampstead, NH (US); Gerry White, Dunstable, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/289,248

(22) Filed: Apr. 9, 1999

(51) Int. Cl.[7] ............................................... G06F 15/73
(52) U.S. Cl. ...................... 709/223; 709/217; 709/224; 709/225; 709/208; 370/241; 370/352; 725/110; 725/111
(58) Field of Search ................................ 709/220, 223, 709/224, 225, 226; 725/110, 111, 119, 109

(56) References Cited

U.S. PATENT DOCUMENTS

| | | | | |
|---|---|---|---|---|
| 5,742,762 A | * | 4/1998 | Scholl et al. ............... | 395/200 |
| 5,996,010 A | * | 11/1999 | Leong et al. ............... | 709/223 |
| 6,003,077 A | * | 12/1999 | Bawden et al. ............. | 709/223 |
| 6,008,805 A | * | 12/1999 | Land et al. ................. | 345/744 |
| 6,061,665 A | * | 5/2000 | Bahreman ................... | 705/40 |
| 6,219,708 B1 | * | 4/2001 | Martenson .................. | 709/226 |

* cited by examiner

Primary Examiner—Dung C. Dinh
Assistant Examiner—Isaac Wo
(74) Attorney, Agent, or Firm—Blakely Sokoloff Taylor & Zafman (57) ABSTRACT

A method and apparatus for allowing HTTP communication between a first device and a second device, the second device executing an HTTP shell acting as a relay, to relay HTTP requests from the first device to a third device for response. The third device communicates with the second device over SNMP and stores web pages and other information for generating HTTP responses to the first device.

19 Claims, 4 Drawing Sheets

METHOD AND APPARATUS PROVIDING A CABLE MODEM MANAGEMENT AND PROVISIONING SYSTEM

BACKGROUND OF THE INVENTION

1. Field of the Invention

The present invention relates to the field network management and more specifically to managed of devices using the HTML protocol.

2. Description of the Related Art

Figure 1A:
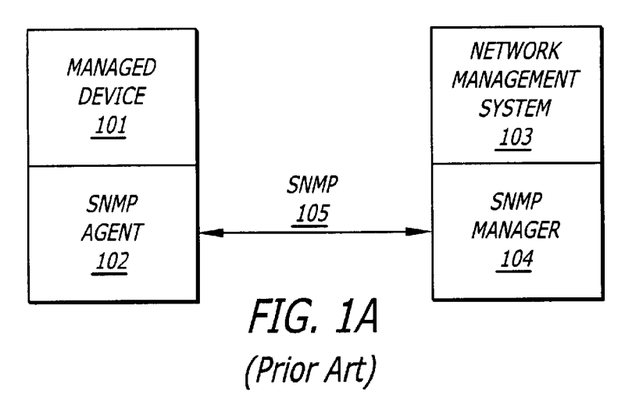
FIG. 1A illustrates a prior art network using an SNMP connection for management.

Simple Network Management Protocol (SNMP) has been the protocol of choice for managing internetworking devices. FIG. 1 illustrates prior art management of a device using SNMP. In FIG. 1, a managed device 101 executes an SNMP agent 102 and communicates over a connection 105 using SNMP with a network management station (NMS) 103 which is also executing an SNMP manager 104.

Despite relatively widespread implementation of SNMP managed devices such as device 101, network management station software (and stations executing such software), e.g. station 103 may be unavailable, difficult to maintain or of limited capabilities.

Figure 1B:
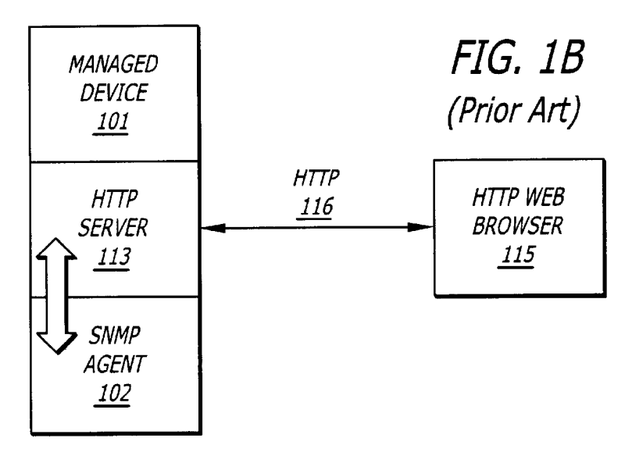
FIG. 1B illustrates a prior art network using a web browser and HTTP for management.

Thus, it has become desirable to utilize hypertalk markup language (HTML) to facilitate communication between the managed device and the management device. FIG. 1(b) illustrates an implementation of this technique. As is illustrated in FIG. 1(b), a HTTP web browser 115 is used to manage the device 101 over an HTTP network 116. The device 101 includes an HTTP server 113 which communicates with an SNMP agent. In this way, existing SNMP agent code can be utilized while still allowing management using an HTTP browser. Unfortunately, this implementation requires web pages to be constructed and stored at the device 101 for each function to be managed. While this solution may be workable for some devices, other devices may have more limited storage capability. An example, may be cable modems and the like which have relatively limited storage capability.

Figure 1C:
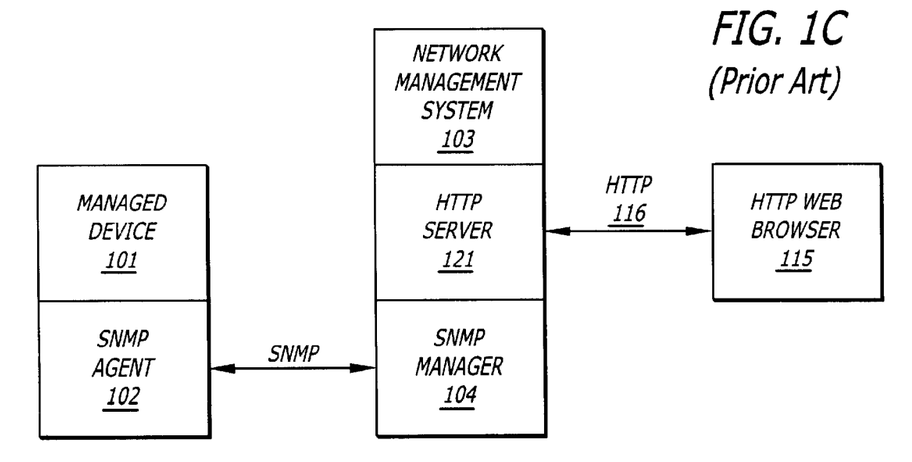
FIG. 1C illustrates a prior art network using a web browser and HTTP for management of a device using a network management station implementing SNMP as an intermediary between the web browser and the managed device.

A third approach is illustrated by FIG. 1(c). In this implementation, a network management system 103 includes an HTTP server 121 which communicates over a HTTP network 116 with a HTTP web browser 115. The network management system also includes a SNMP manager 104 which communicates with an SNMP agent 102 executing on the managed device. Thus, management using HTML web pages is achieved by providing a level of indirection between the managed device 101 and the managing web browser 115. Storage requirements at the managed device are reduced because the web pages themselves are stored at the network management system 103.

While the implementation of FIG. 1(c) overcomes certain of the issues discussed in connection with FIG. 1(b), the level of indirection required by this implementation leads to certain complications.

Thus, what is desired is an improved method and apparatus for allowing management of network devices using HTML.

SUMMARY OF THE INVENTION

A method and apparatus for providing communication between a first device and a second device in a network. In the described embodiment, it is desirable to allow communication from the first device using HTTP requests. It is further desirable to limit storage and other operational requirements imposed on the second device. Thus, the second device utilizes an HTTP relay to relay HTTP requests from the first device to a web server where the requests are serviced. Any needed information from the second device, for formulating an HTTP response, is obtained by the web server using SNMP requests.

Figure 3:
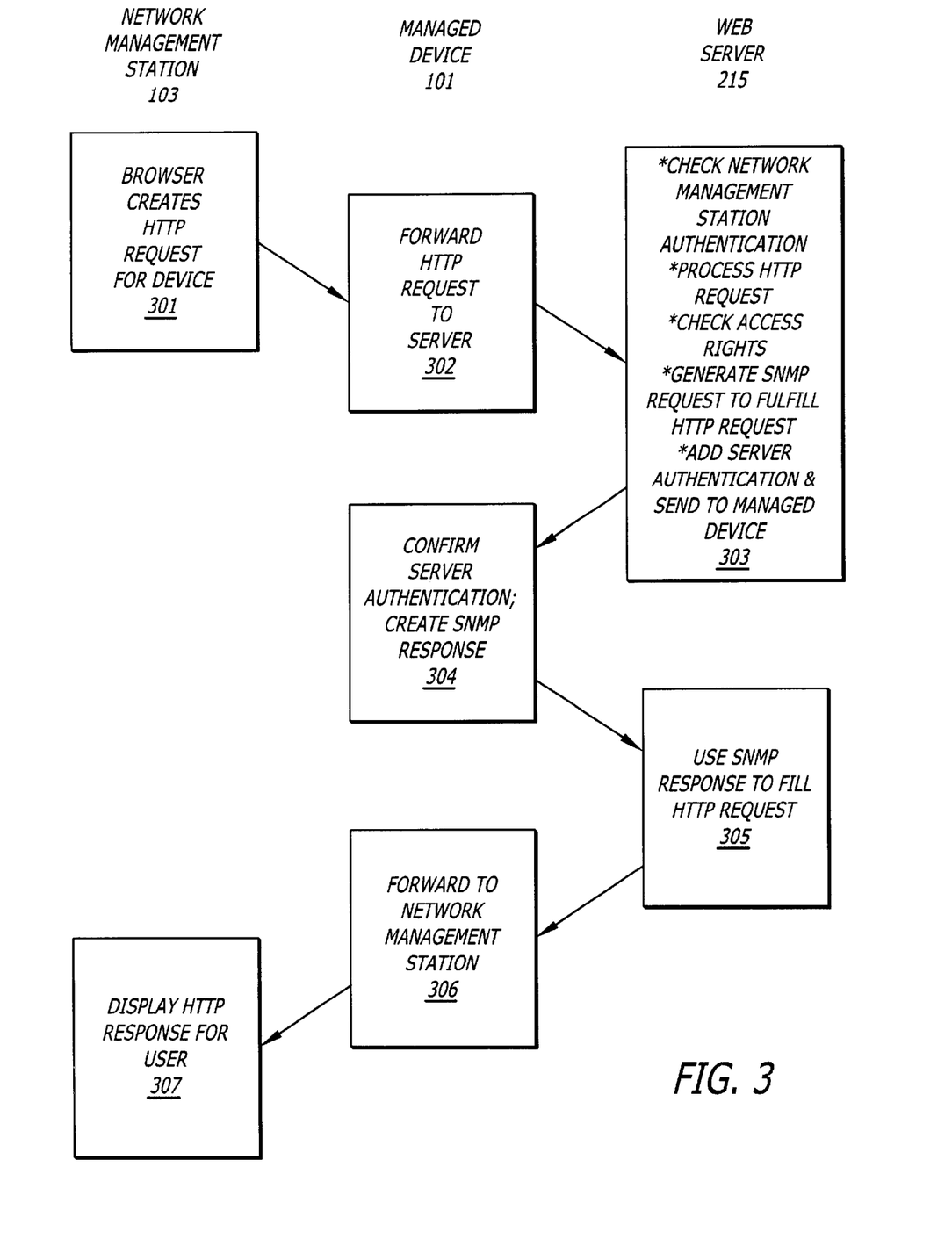
FIG. 3 illustrates a method for obtaining network management information as may be utilized by an embodiment of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

As was discussed in the background section, it is desirable to provide for management of devices using HTTP—in effect allowing the managed device to function as an HTTP server which handles requests for management information over an HTTP connection to a network management station. However, certain classes of devices (such as, for example, cable modems) have minimal storage capacity and, as a result, storage of HTTP web pages at the devices is impractical. The present invention proposes an architecture whereby a "tunnel" or "relay" is used to allow HTTP requests to be relayed from the managed device to a more full blown HTTP server.

Figure 2:
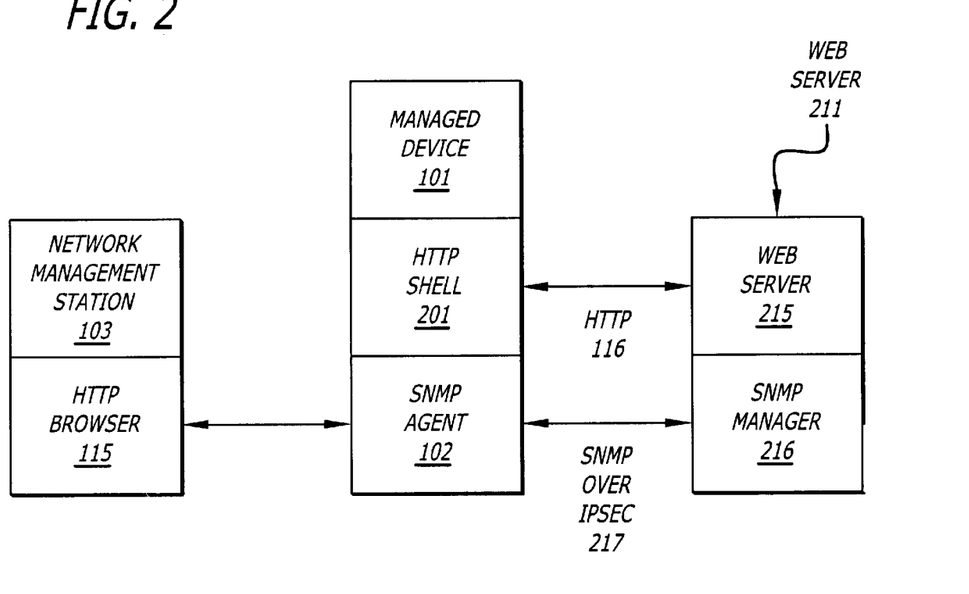
FIG. 2 illustrates a network implementing HTTP management of networked devices as may be implemented by an embodiment of the present invention.

Turning to FIG. 2, a high level diagram illustrating an Implementation of the present invention is shown. As illustrated by FIG. 2, the managed device 101 comprises an HTTP shell 201 and an SNMP agent 102. The HTTP shell is coupled in communication with a network management station 103 executing any HTTP web browser 115 (e.g., the Netscape Navigator or the Internet Explorer). In certain embodiments, the network management station may execute an authentication mechanism for communications with the managed device and may use a secure end-to-end communication such as secure HASP (SHTTP).

The HTTP shell 201 acts as a re-director to redirect requests from the network management station to the web server 211 using the relay (or tunneling) capability of HTTP. The web server 211 executes a web server 215 and an SNMP manager 216 and is coupled in communication with the managed device 101 preferably over a secure connection. In the described embodiment, HTTP communication is carried out using SHTTP and SNMPv3 or SNMP communication over IPsec (IPsec is an abbreviation for IP security which is designed to provide secure IP communication using public key encryption). The server 211 further stores web pages for display on the network management station. As one feature of the present invention, by providing for central storage of the web pages the need for storage of the web pages at each of the individual managed devices 101 is eliminated reducing storage requirements at the managed devices 101. Further, the web pages may be customized by vendors of the managed devices at the central location without need for individual updates being provided to the managed devices 101.

Figure 4:
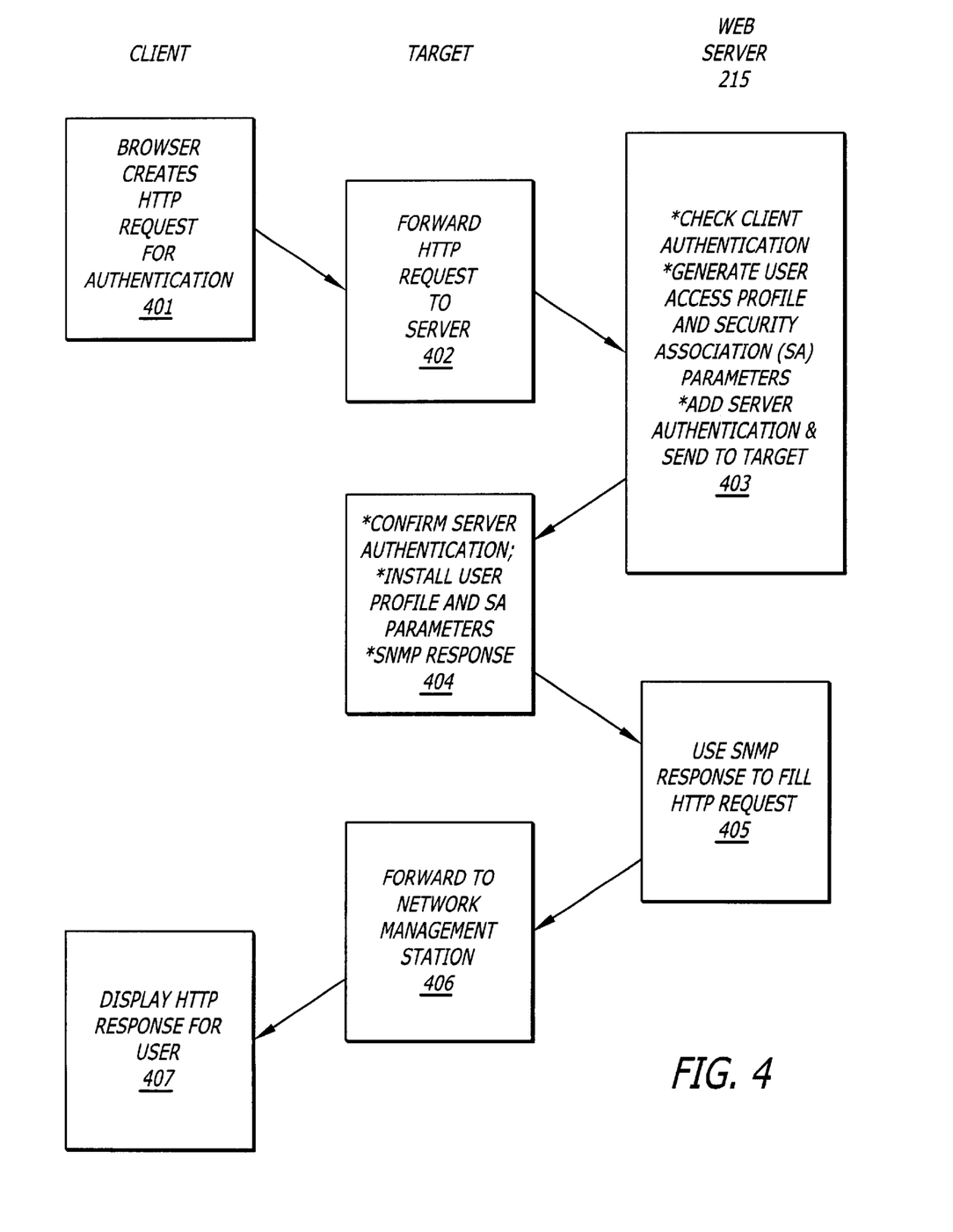
FIG. 4 illustrates an alternative embodiment of the present invention for providing user authentication.
Figure 5:
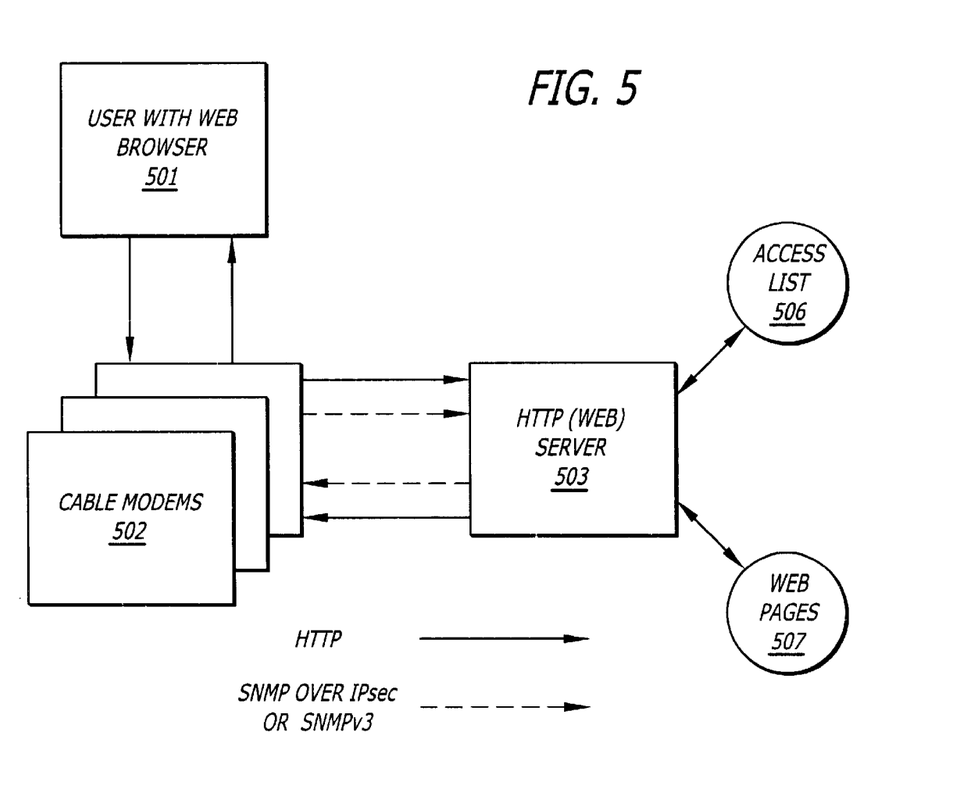
FIG. 5 illustrates a high level overview of a network implementing an embodiment of the present invention.

FIG. 5 provides a high level block diagram of an implementation of the present invention. As shown in FIG. 5, a user with a web browser 501 may communicate over HTTP (and as discussed above, in certain embodiments over SHTTP) with cable modems, cable modem head ends or other managed devices 502. The cable modems 502 relay the HTTP requests from the user over HTTP to a HTTP server 503. Communication then occurs between the server 503 and the cable modems 502 using either SNMPv3 or SNMP over IPsec 217 (this communication will be discussed in greater detail In connection with FIGS. 3 and 4). Finally, web pages are communicated back to the user 501 from the server 503 over HTTP with the cable modem 502 acting as a relay.

The server 503 stores both access lists (providing information on authorized users, etc.) 506 and web pages 507.

Turning now to FIG. 3, a method of communication as may be utilized by the present invention is described in greater detail. As is shown in FIG. 3, the network management station 103 creates an HTTP request for the managed device 101, step 301. This request is sent, over HTTP to the managed device 101, where it is relayed to the web server 215, step 302. The web server 215 authenticates the network management station, processes the HTTP request, checks access rights against the access list database 506, generates an SNMP request for forwarding to the managed device 101 in order to get data to fulfill the HTTP request (e.g., status information), and formats an SNMP message with server authentication to send to the managed device 101, step 303. The managed device then confirms the server authentication information and creates an SNMP response, step 304 which is sent back to the web server 215. The web server 215 uses the data in the SNMP response to complete the response to the HTTP request and forwards the resulting HTTP web page to the managed device 101, step 305. The managed device then forwards the HTTP web page to the network management station 103, step 306 where it is displayed for the user, step 307.

In an alternative embodiment, the described method may be used to provide user authentication for the managed device or other target device. This is shown in greater detail with reference to FIG. 4. This method may have application with any number of applications. For example, in multiuser applications, the technique may be used to restrict user access (such as access to internal vs. external web sites) or put a user into a particular virtual private network (VPN). In a home setting, this technique may be used to implement parental controls. Initially, a browser at the client creates an HTTP request for authentication, step 401. The target device relays the request to the web server, block 402. The web server authenticates the client (e.g., based on user name and password), generates a user access profile and security parameters and creates an SNMP message to send to the target device, step 403. The target device receives the SNMP message and authenticates the server. After authentication of the server, the target device installs the user profile and security parameters and provides an SNMP message to the web server, step 404. The web server then creates an HTTP web page and forwards it to the target, step 405 which relays the page to the client, step 406. The web page may then be displayed by the client, step 407, confirming completion of the transaction.

Thus, what has been disclosed is a method and apparatus for providing management of devices using HTTP.

What is claimed is:

1. A method of providing management information by a managed device comprising:
   a) the managed device receiving an HTTP request for management information from a network management station;
   b) the managed device relaying the HTTP request to a server;
   c) the managed device receiving an HTTP response from the server; and
   d) the managed device relaying the HTTP response to the network management station.

2. The method as recited by claim 1 further comprising the steps of the managed device receiving an SNMP request from the server after relaying the HTTP request to the server and the managed device providing an SNMP response to the server responsive to the SNMP request before receiving the HTTP response from the server.

3. The method as recited by claim 1 wherein the HTTP request is a secure HTTP request.

4. The method as recited by claim 2 wherein the SNMP request is received over a secure connection.

5. The method as recited by claim 1 wherein the managed device is a cable modem.

6. A method for providing information in a network comprising:
   a) a web server receiving an HTTP request from a device;
   b) the web server transmitting an SNMP request to the device;
   c) the web server receiving an SNMP reply from the device;
   d) the web server transmitting an HTTP response to the device.

7. The method as recited by claim 6 wherein the HTTP request comprises a request for network management information from a managed device.

8. The method as recited by claim 6 wherein the HTTP request comprises a request for user access to a target device.

9. The method as recited by claim 6 wherein the HTTP request is a secure request.

10. The method as recited by claim 6 wherein in the SNMP request is made over a secure connection.

11. A method for providing information from a first device to a second device in a network comprising the steps of:
   a) the first device transmitting an HTTP request to the second device;
   b) the second device relaying the HTTP request to a third device;
   c) the third device transmitting an SNMP request to the second device responsive to receiving the HTTP request;
   d) the second device responding to the SNMP request by providing an SNMP response to the third device;

e) the third device transmitting an HTTP response to the second device; and f) the second device relaying the HTTP response to the first device.

12. The method as recited by claim 11 wherein the first device is a network management station.

13. The method as recited by claim 11 wherein the second device is a cable device chosen from a cable modem or a cable head end.

14. The method as recited by claim 11 wherein the third device is a web server.

15. The method as recited by claim 11 wherein the HTTP request is a secure HTTP request.

16. The method as recited by claim 11 wherein the SNMP request is made over a secure connection.

17. A managed device comprising:

a) executable code stored on a storage medium for receiving an HTTP request for management information from a network management station b) the executable code further for relaying the HTTP request to a server;

c) the executable code further for receiving an HTTP response from the server;

d) the executable code further for relaying the HTTP response to the network management station; and e) the executable code further providing an SNMP agent for the managed device.

18. The managed device as recited by claim 17 wherein the executable code is further for providing secure internet protocol (IP) communication.

19. The managed device as recited by claim 17 wherein the managed device is a cable device chosen from a cable modem or a cable head end.

* * * * *

UNITED STATES PATENT AND TRADEMARK OFFICE
CERTIFICATE OF CORRECTION

PATENT NO.    : 6,487,592 B1
DATED         : November 26, 2002
INVENTOR(S)   : Sawyer et al.

It is certified that error appears in the above-identified patent and that said Letters Patent is hereby corrected as shown below:

<u>Title page,</u>
*Assistant Examiner*, please delete "Issac Wo" and insert -- Isaac M. Woo --.

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO.     : 6,487,592 B1
DATED          : November 26, 2002
INVENTOR(S)    : Sawyer et al.

It is certified that error appears in the above-identified patent and that said Letters Patent is hereby corrected as shown below:

<u>Title page,</u>
Item [56], References Cited, U.S. PATENT DOCUMENTS, please insert:
-- 6,044,090   03/28/00   Grau, et al.
   6,044,107   03/28/00   Gatherer, et al.
   6,047,019   04/04/00   Ishii
   4,236,251   11/25/80   Ohgishi, et al.
   5,130,974   07/14/92   Kawamura, et al.
   5,249,303   09/28/93   Goeken
   5,303,400   04/12/94   Mogi
   5,682,147   10/28/97   Eaton, et al.
   5,689,506   11/18/97   Chiussi, et al.
   5,740,533   04/14/98   Lin
   5,781,582   07/14/98   Sage, et al.
   5,790,806   08/04/98   Koperda
   5,812,937   09/22/98   Takahisa, et al.
   5,883,901   03/16/99   Chiu, et al.
   5,887,247   03/23/99   Baltus, et al.
   5,894,479   04/13/99   Mohammed
   5,917,822   06/29/99   Lyles, et al.
   5,937,338   08/10/99   Tomita
   5,960,336   09/28/99   Ikawa, et al.
   5,963,557   10/05/99   Eng
   5,986,691   11/16/99   Henderson
   6,011,548   04/04/00   Thacker
   6,018,767   01/25/00   Fijolek, et al.
   6,061,721   05/2000    Ismael et al --

UNITED STATES PATENT AND TRADEMARK OFFICE
CERTIFICATE OF CORRECTION

PATENT NO. : 6,487,592 B1
DATED : November 26, 2002
INVENTOR(S) : Sawyer et al.

It is certified that error appears in the above-identified patent and that said Letters Patent is hereby corrected as shown below:

Title page (cont'd),
OTHER PUBLICATIONS, please insert
-- Cable Television Laboratories, Inc., Ref: Radio Frequency Interface Specification.
SP-RFI-104-980724 --

Signed and Sealed this

Twenty-sixth Day of October, 2004

JON W. DUDAS
*Director of the United States Patent and Trademark Office*